United States Patent [19]
Foster

[11] Patent Number: 5,931,284
[45] Date of Patent: Aug. 3, 1999

[54] RECIPROCATING TUBE CONVEYORS

[76] Inventor: Raymond Keith Foster, 401 NW. Adler, Madras, Oreg. 97741

[21] Appl. No.: 09/190,662

[22] Filed: Nov. 12, 1998

Related U.S. Application Data

[62] Division of application No. 08/840,085, Apr. 9, 1997, Pat. No. 5,860,508.

[51] Int. Cl.$^6$ .................................... B65G 25/04
[52] U.S. Cl. .................................... 198/750.5; 198/750.1; 198/750.2; 198/750.7
[58] Field of Search ............................. 198/750.5, 750.2, 198/750.1, 750.7; 414/525.1, 509

[56] References Cited

U.S. PATENT DOCUMENTS

| | | | |
|---|---|---|---|
| 4,184,587 | 1/1980 | Hallstrom | 198/750.2 |
| 4,611,708 | 9/1986 | Foster | 198/750.1 |
| 5,234,309 | 8/1993 | Foster | 198/750.1 |
| 5,355,995 | 10/1994 | Foster | 197/750.1 |
| 5,402,878 | 4/1995 | Lutz | 198/750.2 |
| 5,664,663 | 9/1997 | Wilkens | 198/750.1 |

Primary Examiner—William E. Terrell
Assistant Examiner—Khoi H. Tran
Attorney, Agent, or Firm—Delbert J. Barnard

[57] ABSTRACT

A plurality of elongated, generally side-by-side conveyor tubes (28) are positioned within a material container (10) to provide spaces (30) between the conveyor tubes (28). A drive mechanism (DM) is connected to ends of the conveyor tubes (28), for reciprocating the conveyor tubes (28). The drive mechanism (DM) functions to move the conveyor tubes (28) in one direction, for moving material that is on and between the conveyor tubes (28), and for retracting the conveyor tubes (28) in the opposite direction.

25 Claims, 9 Drawing Sheets

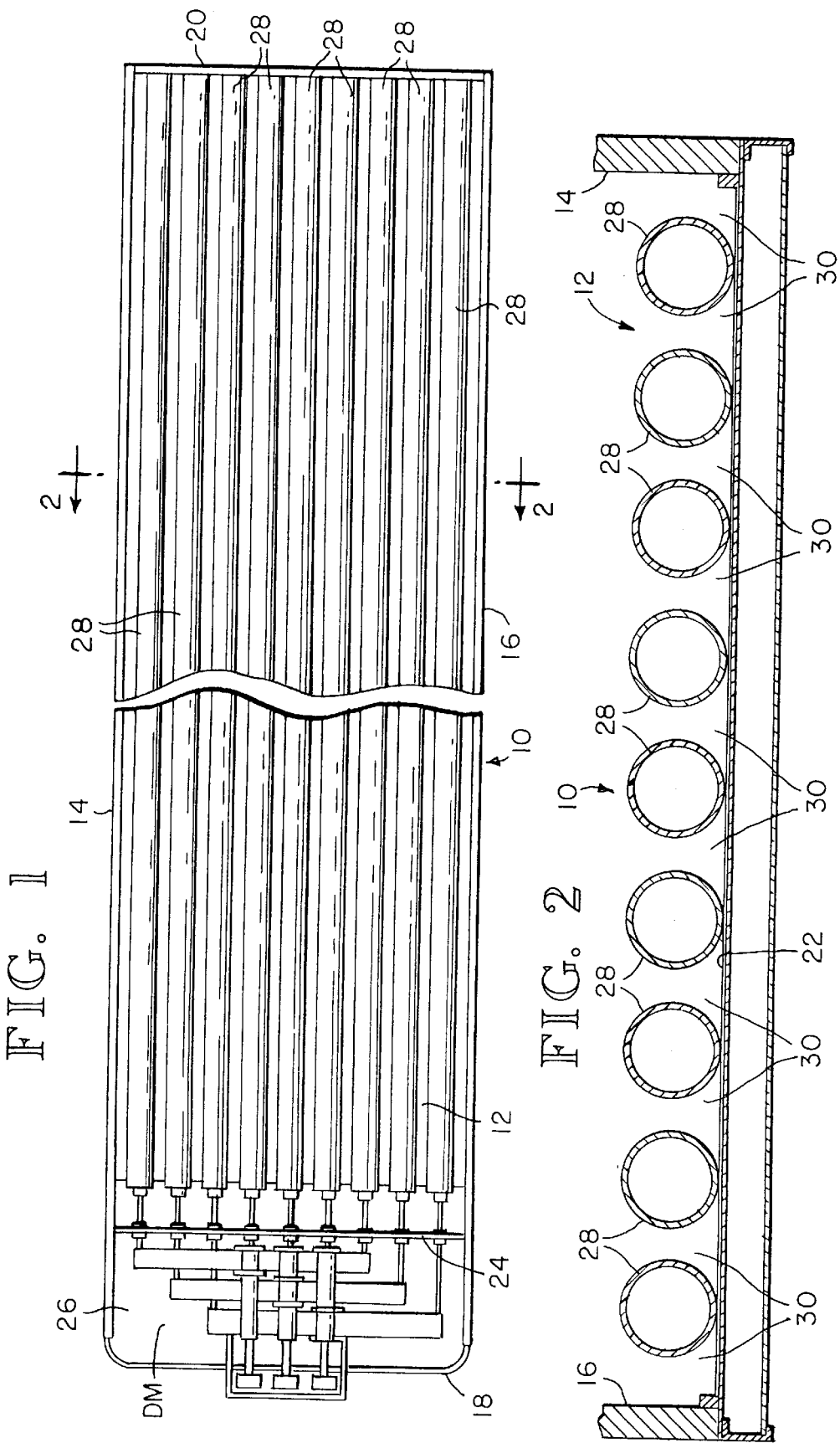

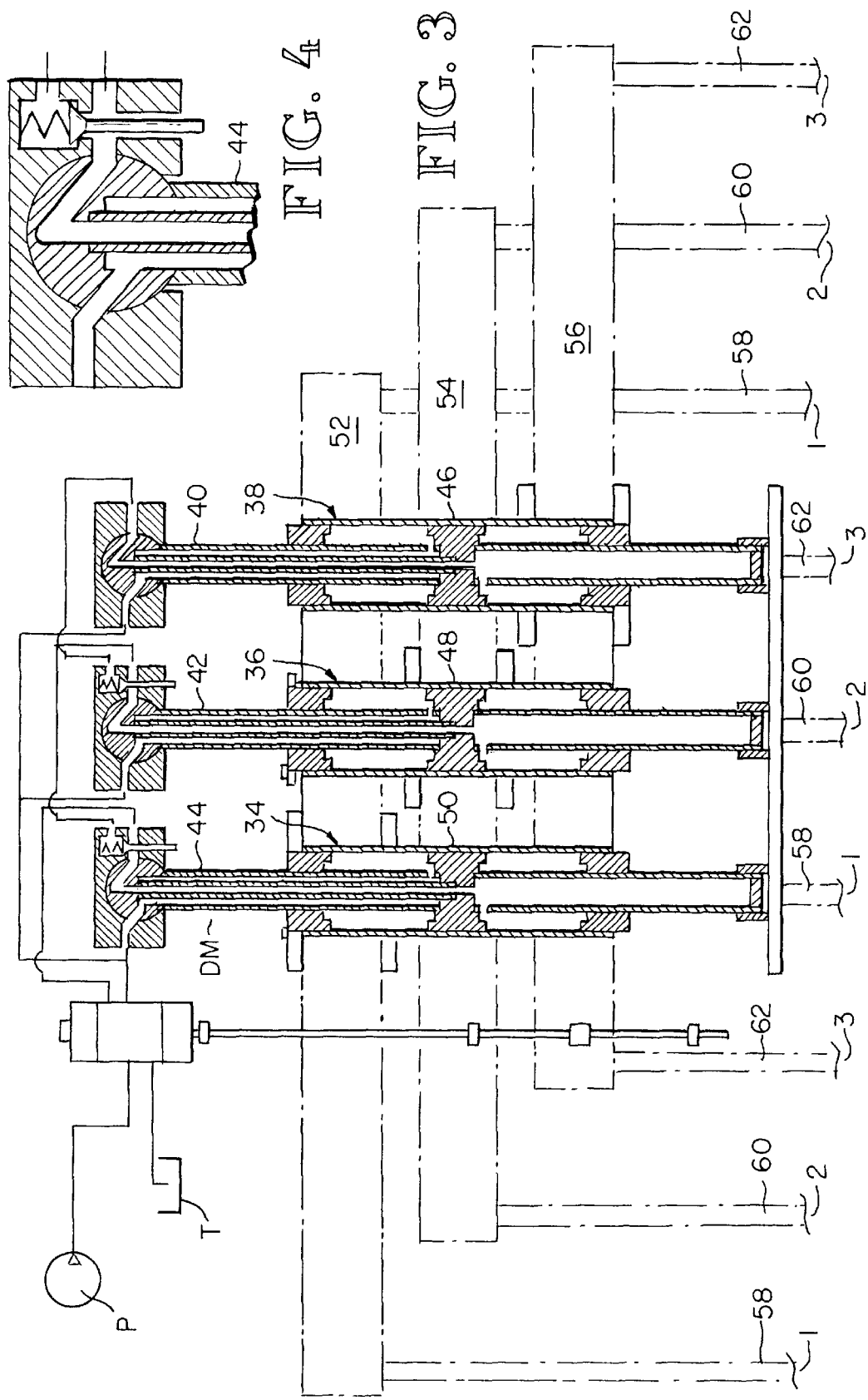

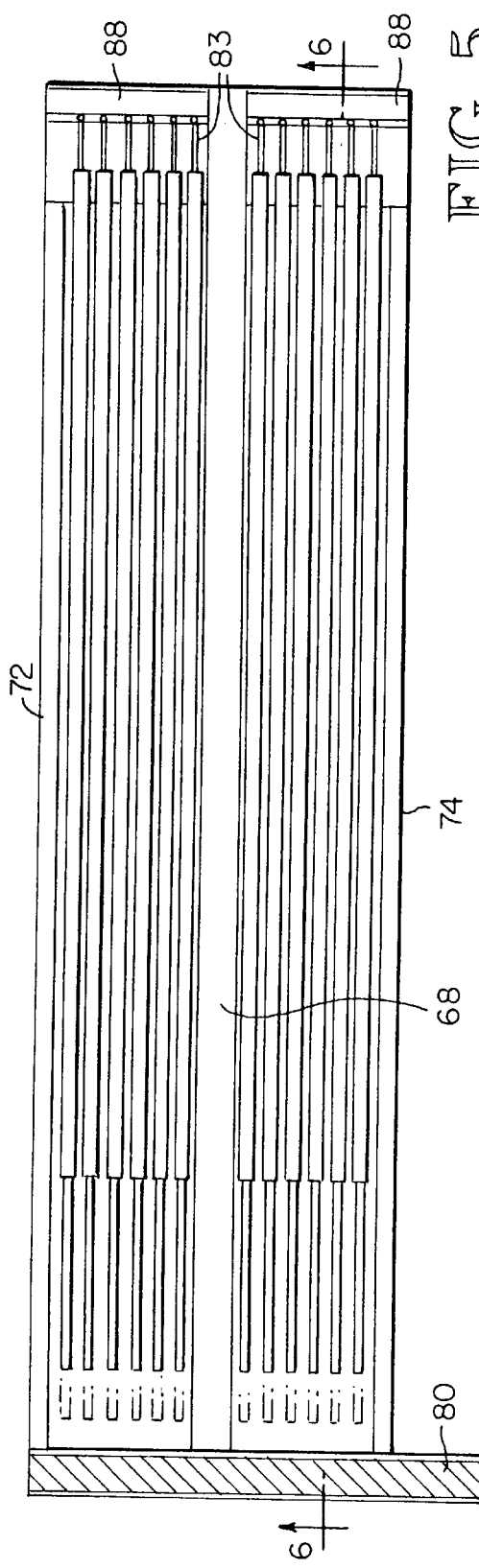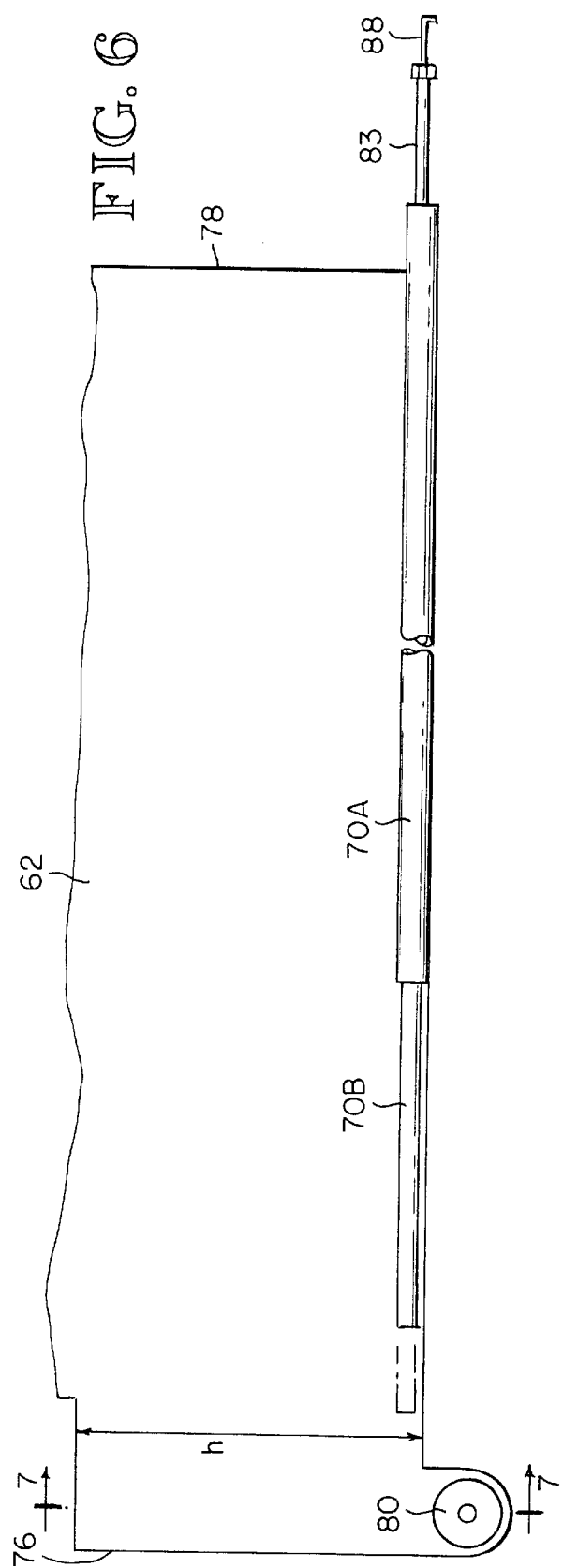

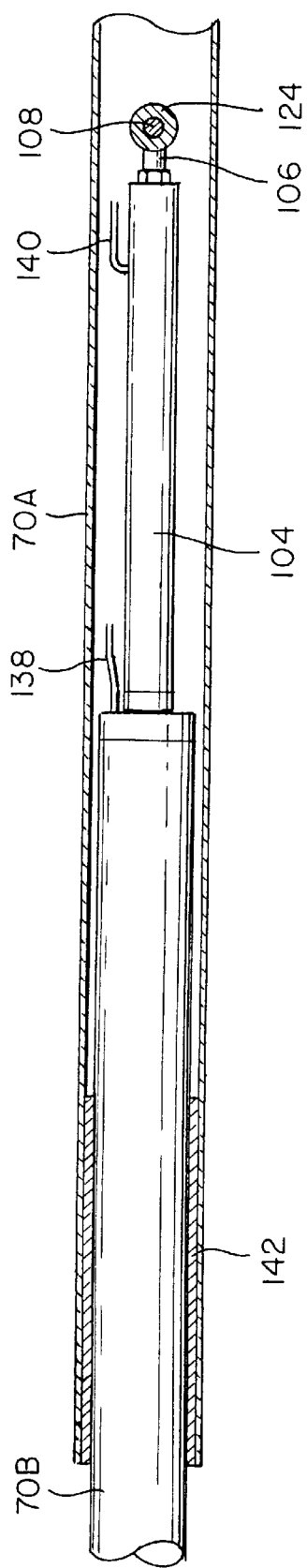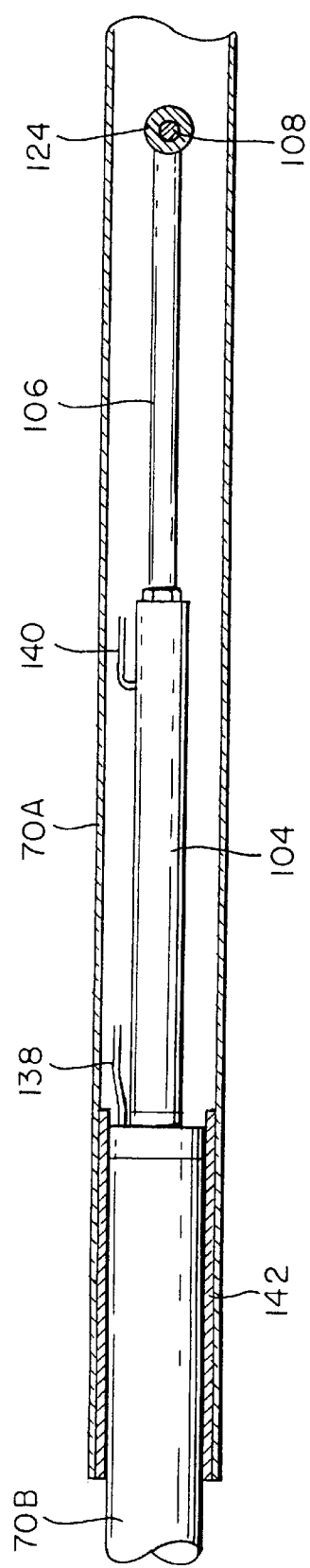

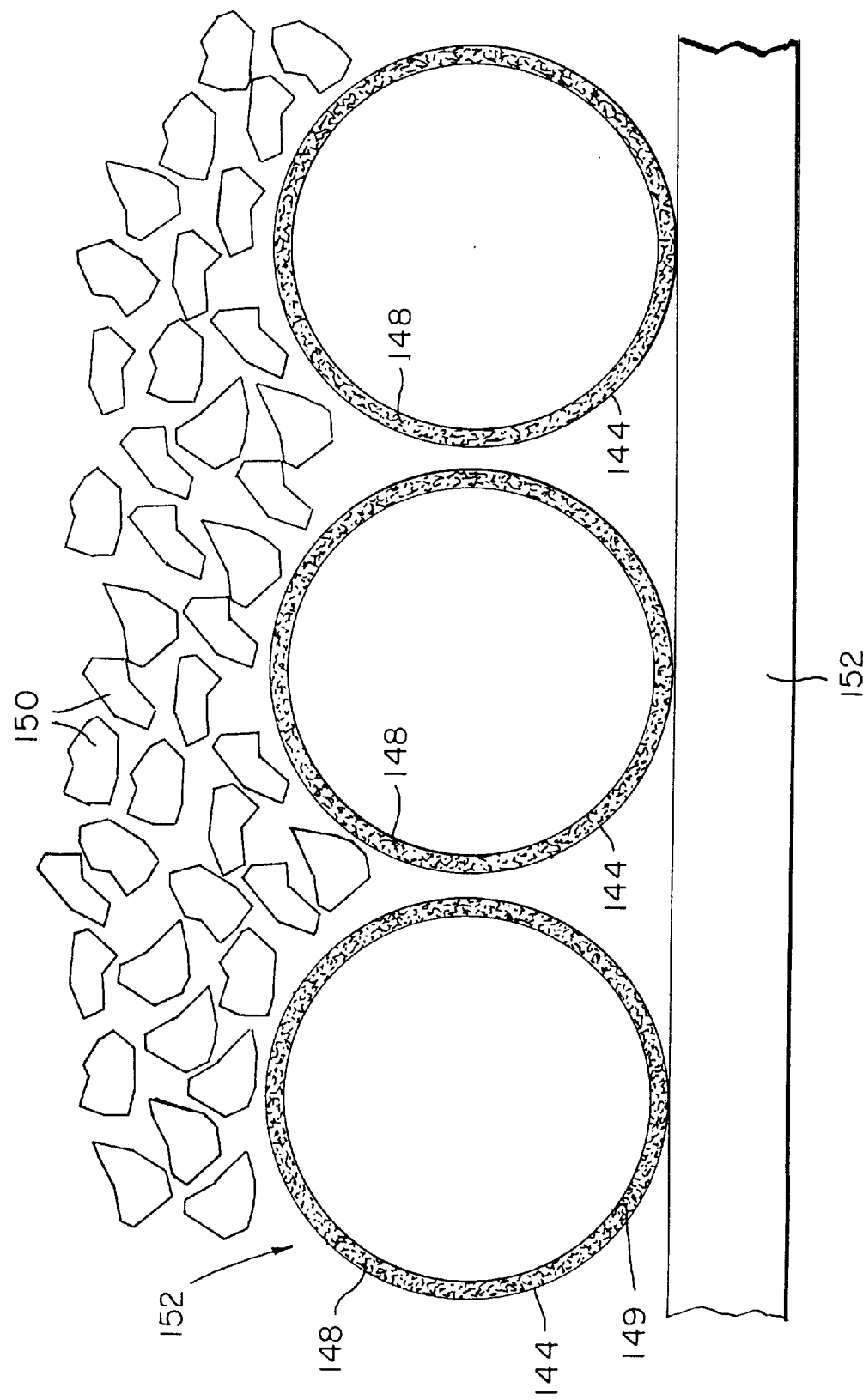

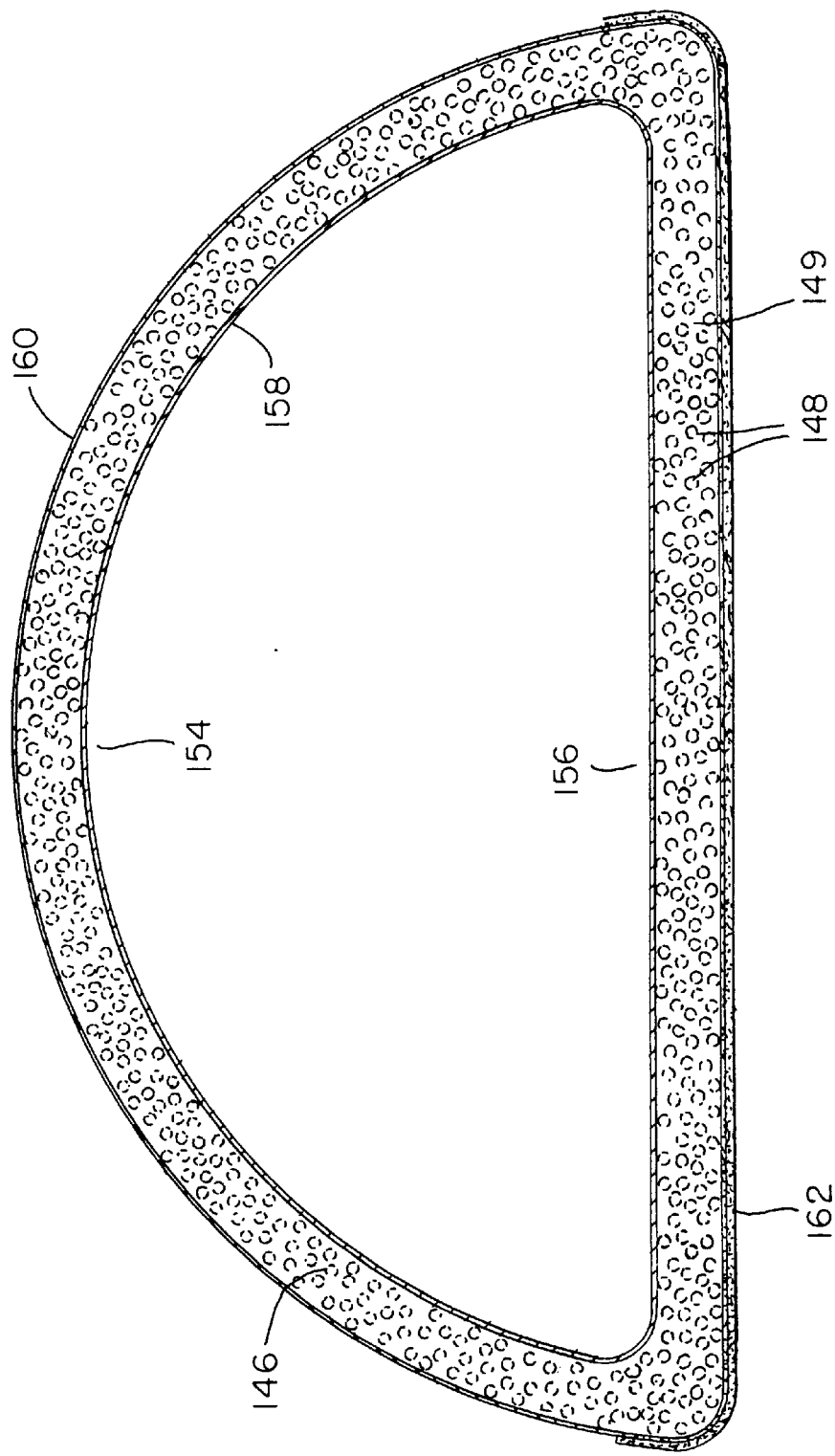

RECIPROCATING TUBE CONVEYORS

This application is a division of my application Ser. No. 08/840,085, filed Apr. 9, 1997, now U.S. Pat. No. 5,860,508, and entitled Reciprocating Tube Conveyors.

TECHNICAL FIELD

This invention relates to the provision of reciprocating tube conveyors for moving particulate materials such as wood particles, ice particles, crushed glass and refuse.

BACKGROUND OF THE INVENTION

Reciprocating slat conveyors are in wide use in both vehicular and stationary installations for handling a variety of materials. For example, my U.S. Pat. No. 4,748,893, granted Jun. 7, 1988, and entitled Drive/Frame Assembly for a Reciprocating Floor has a substantial use in vehicles that haul garbage. My U.S. Pat. No. 4,611,708, granted Sep. 16, 1986, and entitled Reciprocating Channel Floor Conveyor discloses conveyors that are particularly suited for the conveying ice particles and refuse or garbage. The conveyor disclosed by my U.S. Pat. No. 4,748,893, utilizes both bearings for the conveyor slats and seals between the slats. The conveyors disclosed by my U.S. Pat. No. 4,611,708, include bearings for the slats but are designed to function without the need for seals between adjacent slats. An object of the present invention is to provide a new and unique conveyor for particulate materials that eliminates the need for seals and further either eliminates the need for bearings or provides for the use of bearings in the form of sheets of a self-lubricated plastic bearing material in place of individual bearings for the movable conveyor members.

DISCLOSURE OF THE INVENTION

The present invention relates to the provision of a reciprocating tube conveyor. The conveyor comprises a plurality of elongated, generally side-by-side tubes positioned to provide spaces between the tubes. A drive mechanism for reciprocating the tubes includes a drive member for each tube, the drive members are connected to common ends of the tubes. The drive mechanism functions to move the tubes in one direction for moving material that is on and between the tubes, and for retracting the tubes in the opposite direction. In preferred form, the tubes are generally circular in cross-section.

According to an aspect of the invention, the conveyor includes a generally horizontal support surface and the tubes are above the support surface. The support surface may be constructed from a low friction material. The tubes may make at least some contact with the support surface. The tubes may be spaced upwardly from the support surface throughout at least a portion of their lengths. The tubes may be constructed from metal or a structural plastic material. They may be constructed from a wear-resistant resin material reinforced by fibers, such as glass or graphite fibers, for example. The tubes may be constructed by use of a pultrusion process. In preferred form, the conveyor tubes are in sets. The drive mechanism may include a transverse drive beam for each set of tubes, in which case the drive members extend from the drive beams to the ends of the tubes. Or, a separate piston-cylinder drive unit may be provided for each tube.

An aspect of the invention is the provision of a reciprocating tube conveyor in which each tube has a first portion and a second portion that is a telescopic engagement with the first portion. The first portion has a first end and a second end. The second portion has a first end inside the first portion and a second end outside the first portion spaced endwise outwardly from the second end of the first portion. A first piston-cylinder drive unit is connected to the first end of the first portion of each tube. A second piston-cylinder drive unit is positioned inside the first portion of each tube and is connected at one end to the first portion of the tube and at a second end to the first end of the second portion of the tube. The first drive units serve to push the tubes for moving material that is in contact with the tubes and for pulling the tubes for retracting them to a start position. The second drive units serve to push the second portions of the tubes outwardly from the first portions of the tubes, for moving material in contact with the second portions of the tubes, and for pulling the second portions of the tubes back into the first portions of the tubes, for retracting them to a start position. This conveyor may be located within a storage container for a particulate material, on the bottom of the container. In addition to the bottom, this container includes four sidewalls. Three of the sidewalls extend upwardly from the bottom. The fourth sidewall extends upwardly from a discharge opening adjacent the bottom. The conveyor tubes are oriented to move material towards the discharge opening. The second end portions of the tubes may be operated for moving material to and out through the discharge opening until the level of material in the container above the second portions of the conveyor tubes has dropped to a relatively low level. Then, the first piston-cylinder drive units may be operated for moving the tubes for advancing additional material towards the wall that includes the discharge opening.

These and other advantages, objects and features will become apparent from the following best mode description, the accompanying drawings, and the claims, which are all incorporated herein as part of the disclosure of the invention.

BRIEF DESCRIPTION OF THE DRAWINGS

Like reference numerals are used to designate like parts throughout the several views of the drawing, wherein:

FIG. 1 is a top plan view of a container having a drive mechanism compartment at one end, separated by a bulk head from a material containing compartment which is provided with conveyor tubes;

FIG. 2 is a cross-sectional view taken substantially along line 2—2 of FIG. 1, showing the material compartment and the conveyor tubes in cross-section;

FIG. 3 is a schematic diagram of a preferred embodiment of a drive mechanism for the conveyor tubes;

FIG. 4 is an enlarged scale fragmentary sectional view at the forward end of a piston-cylinder unit;

FIG. 5 is atop plan view of a second embodiment of the invention, characterized by two section conveyor tubes;

FIG. 6 is a longitudinal sectional view taken substantially along line 6—6 of FIG. 5;

FIG. 12 is a view similar to FIG. 9, but showing the inner tube section and its drive unit in elevation;

FIG. 13 is a view like FIG. 12, but showing the inner tube section extended from the position shown in FIG. 12;

FIG. 14 is a sectional view taken through a tube conveyor for conveying ice, showing conveyor tubes made by a pultrusion process;

FIG. 15 is a sectional view taken through a tube conveyor that has a substantially D-shaped cross-section, such tube also being formed by a pultrusion process;

BEST MODE FOR CARRYING OUT THE INVENTION

Figure 7:
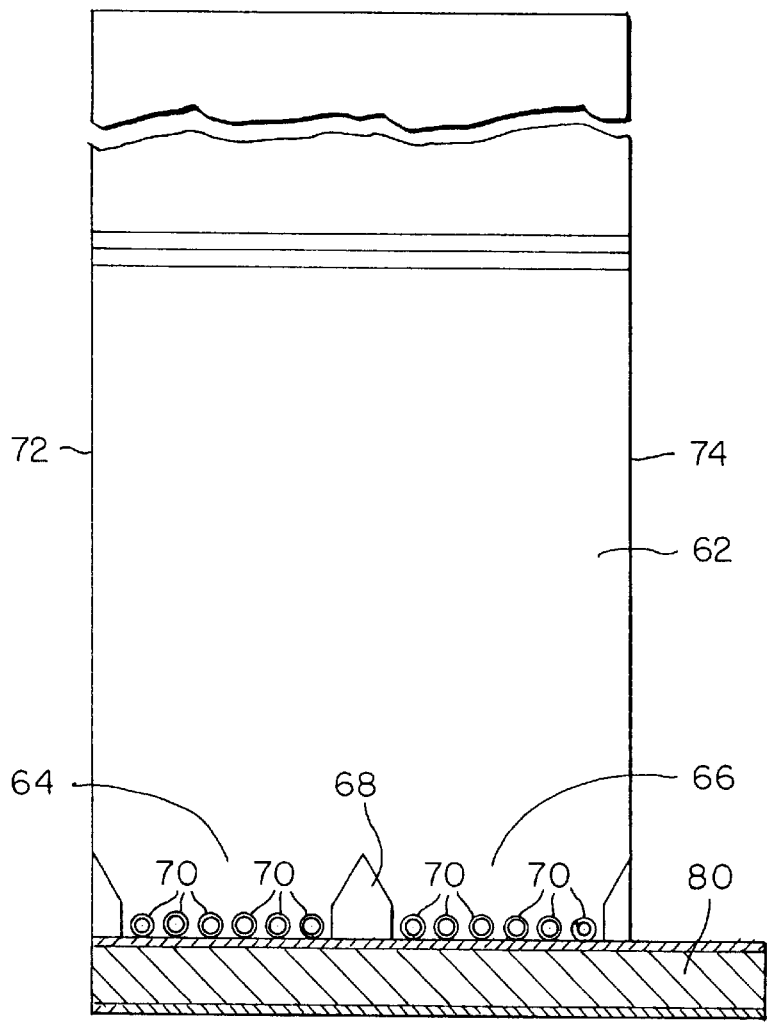
FIG. 7 is a cross-sectional view taken substantially along line 7—7 of FIG. 6.

Referring to FIGS. 1 and 2, a reciprocating tube conveyor 10 is shown within a material receiving container 12. By way of typical and therefore nonlimitive example, container 12 may be a truck box, a trailer box or a stationary container or bin. Container 12 may have sidewalls 14, 16, a front wall 18, a rear wall 20 and a bottom 22. Rear wall 20 may be a door or a pair of doors. In the embodiment of FIGS. 1–3, a bulkhead 24 helps to define a drive assembly compartment 26 at the forward end of the container 12. The forward wall 18, forward portions of the sidewalls 14, 16, the forward portion of the bottom 22 and a sloping cover wall (not shown) together define the compartment 26 in which the drive assembly is housed. The drive assembly and the compartment 26 may be as disclosed in my U.S. Pat. No. 5,096,356, granted Mar. 17, 1992.

In the embodiment of FIGS. 1–3, the reciprocating tube conveyor 10 is composed of a plurality of elongated, generally side-by-side tubes 28 that are positioned to provide spaces 30 between the tubes 28. Compartment bottom 22 may provide a continuous unbroken surface. In some installations, it may comprise a slab of concrete with or without a covering surface. In some installations it will be advantageous to provide the bottom 22 with an upper surface that is constructed from a relatively low friction material. By way of example, it may be covered with thin sheets of thermoplastic resin material such as Teflon (trademark), Delrin (trademark), polyethylene, etc., or some other suitable plastic or composite material having a low coefficient of friction.

In the embodiment of FIGS. 1–3, the conveyor tubes 28 are divided into groups and sets. In FIG. 3, the sets are labeled "1," "2," "3." Each group includes a tube from each set. The first group includes a tube 28 from set "1," then a tube 28 from set "2" and then a tube 28 from "2." This pattern is repeated across the full width of the conveyor 10. In the embodiment of FIGS. 1 and 2, the conveyor 10 is nine tubes wide. Thus, it is composed of three groups.

In the embodiment of FIGS. 1–3, a separate piston-cylinder drive unit is provided for each set of conveyor tubes 28. The drive unit for set "1" is designated 34. The drive unit for set "2" is designated 36. The drive unit for set "3" is designated 38. In preferred form, the drive units 34, 36, 38 have fixed piston components 40, 42, 44 and movable cylinder components 46, 48, 50, as disclosed in U.S. Pat. No. 5,096,356. The fixed piston components 40, 42, 44 are connected to a frame that is fixed in position relative to the bottom 22. The movable cylinder components 46, 48, 50 are connected to transverse drive beams 52, 54, 56, one for each set of conveyor tubes. Drive rods 58, 60, 62 project axially from the drive beams 52, 54, 56 to the conveyor tubes 28. In FIG. 3, the set "1" drive rods are designated 58. The set "2" drive rods are designated 60, the set "3" drive rods are designated 62.

The drive mechanism may include a control system such as disclosed in the aforementioned U.S. Pat. No. 5,096,356. Such control system is hereby incorporated herein by this specific reference to U.S. Pat. No. 5,096,356. As disclosed in U.S. Pat. No. 5,096,356, the three drive units 34, 36, 38 are operated in unison to move all of the conveyor tubes 28 together from the front to the rear of the container 14. As they move, the conveyor tubes 28 move with them the material that is above them and at least a portion of the material that is in the spaces 30 between them. After the drive units 34, 36, 38 are fully extended, they are returned or retracted one at a time. Retraction of drive unit 34 retracts the set "1" conveyor tubes 28 back to a start position. While this is happening, the conveyor tubes 28 of sets "2" and "3" are stationary. They provide twice as much area and hence twice as much friction to the material than does the moving set "1" conveyor tubes 28. As a consequence, the material does not move while the set "1" conveyor tubes are retracting. The material is held against movement by the set "2" and set "3" conveyor tubes. Following retraction of the set "1" conveyor tubes 28, the set "2" conveyor tubes 28 are retracted. As the set "2" tubes 28 retract, the material is again held against movement by the set "2" and set "3" conveyor tubes 28 which are stationary. Next, the set "3" conveyor slats 28 are retracted while the set "1" and set "2" conveyor slats 28 are stationary and hold the material mass against movement. This sequence is repeated over and over until there is a desire to stop movement of material out from the container 14 or container 14 is empty.

The hydraulic drive and control system disclosed in U.S. Pat. No. 5,096,356 includes an important relationship of the three drive beams 52, 54, 56. When hydraulic fluid is ported to operate the three drive units 34, 36, 38 in unison, the hydraulic fluid is delivered first into the drive unit 34, then into the drive unit 36 and finally into the drive unit 38. As a result, drive unit 34 wants to move first. It moves its drive beam 52 into contact with drive beam 54. Drive beam 54 then moves against drive beam 56. This provides a one-way mechanical interlock between the drive units 34, 36, 38 that assures that all of the conveyor tubes 28 will move together. In the reverse direction, drive unit 34 and its drive beam 52 will move first, moving drive beam 52 away from drive beam 54. Drive beam 54 and its drive unit 36 will move next, moving drive beam 54 away from drive beam 56. Drive unit 38 and its drive beam 56 are the last to retract. This one-way mechanical coupling is not unique to this invention but rather is per se old in the art.

Figure 17:
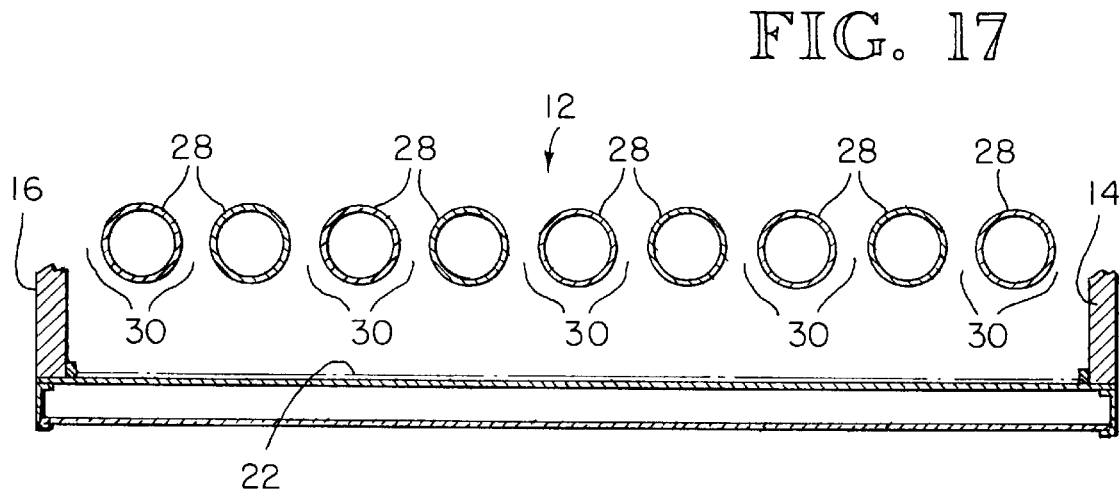
FIG. 17 is a view like FIG. 2 but of a conveyor in which the conveyor tubes are spaced upwardly from the bottom of a material container.
Figure 8:
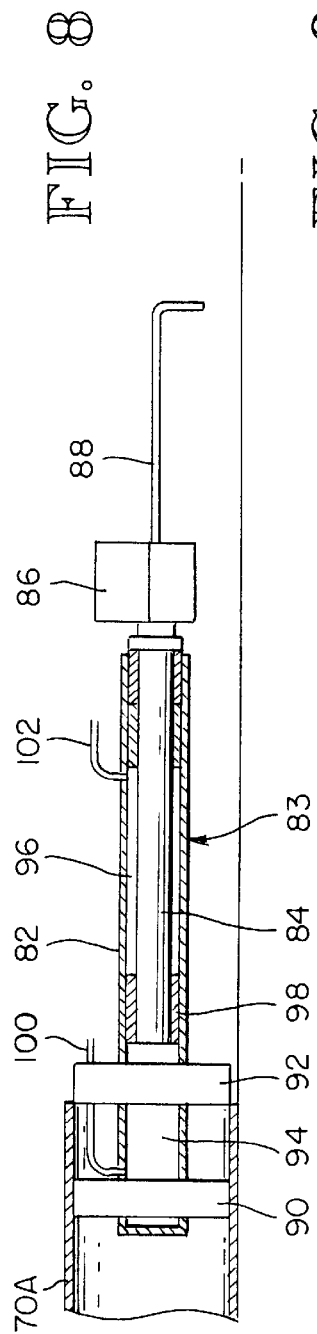
FIG. 8 is a fragmentary sectional view taken at the drive unit end of one of the conveyor tubes in the embodiment of FIGS. 5 and 6.

As shown by FIGS. 2, 14 and 17, the circular cross-section of the conveyor tubes 28 creates a space 30 between each adjacent pair of tubes 28 that starts out wide at the top, then narrows and then widens again at the bottom. An advantage of the circular cross-section of the conveyor tubes 28, the spaces 30 between adjacent tubes 28, and the resulting shape of the spaces 30, is that the tubes 28 present substantial surface area in contact with the material in the container 14, being moved by the conveyor 10. The conveyor embodiment shown by FIGS. 1–3 may be used to convey crushed glass, or a similar material. The crushed glass is deposited into the container 12, between and above the conveyor tubes 28. When the conveyor tubes 28 are moved in unison in the conveying direction, their contact with the crushed glass in the spaces 30 and over the tops of the tubes 28 causes the crushed glass to be dragged forwardly by and with the tubes 28.

By way of typical and therefore nonlimited example, the conveyor 10 may have a stroke length of 12". When it is desired to move the crushed glass or other material out from the container 12, the rear doors 20 are opened. Then, the three drive units 34, 36, 38 are extended in unison, to move all of the conveyor tubes 28 in the conveying direction, the full stroke of the drive units. As the tubes 28 move, they carry with them the crushed glass or other material. At the end of the conveying stroke, the drive units 34, 36, 38 are stopped. Then, they are retracted one at a time. Retraction of drive unit 34 will move with it the drive beam 52, the connecting rods 58 and the conveyor tube set "1." When the drive unit 34 is fully retracted to a start position, drive unit 36 is retracted. This retracts the set "2" conveyor tubes 28. When drive unit 36 is fully retracted to a start position, drive unit 38 is retracted. This retracts the set "3" conveyor tubes.

FIGS. 5–13 disclose a second embodiment of the invention. Referring to FIG. 7, the bottom of material compartment 62 may be divided into two longitudinal sections 64, 66, by a longitudinal divider wall 68. In this embodiment, each section 64, 66 includes six conveyor tubes 70. The container 62 has two sidewalls 72, 74 (FIG. 7) and two end walls 76, 78. The height h at the discharge end of the conveyor may be a fraction of the total height of the container 62 in the remainder of its extend. In this embodiment, the conveyor is moving material to an auger 80 that extends laterally of the container 62. Auger 80 removes material from the discharge end of the container 62.

In the embodiment of FIGS. 5–13, each conveyor tube 70 has two parts, a rear section 70A and a forward section 70B. The forward section 70B is smaller in diameter than the rear section 70A. It is telescopically received within the rear section 70A, as is shown by FIGS. 9, 10, 12 and 13. Referring to FIGS. 5–9, the rear end portion of conveyor tube part 70A is connected to a cylinder component 82 of a piston-cylinder drive unit. The piston component 84 is connected at its rear end 86 to a transverse frame member 88 that may extend the full width of the conveyor. Or, it may be in two sections, one on each side of the longitudinal divider 68. Cylinder component 82 is connected at 90, 92 to the rear end portion of the conveyor section 70A. Working chambers 94, 96 are formed on opposite sides of a piston head 98. A conduit 100 delivers hydraulic fluid or oil into and out from working chamber 94. A conduit 102 delivers hydraulic fluid or oil into and out from working chamber 96. Introduction of hydraulic fluid into working chamber 94 and removal of hydraulic fluid from working chamber 96 causes the conveyor tube section 70A to extend forwardly from the frame member 88. Introduction of hydraulic fluid into working chamber 96 and removal of hydraulic fluid from working chamber 94 causes conveyor tube section 78 to retract towards frame member 88.

A second piston-cylinder drive unit 104 is positioned within each conveyor tube section 70A. It has a fixed piston component 106 that is connected at its rear end to conveyor tube section 70A by a transverse bolt 108. Referring to FIG. 12, conveyor tube section 70A is provided with a pair of side plates 110, 112. The side plates 110, 112 are welded or otherwise connected to the conveyor tube section 70A. Side plates 110, 112 include inwardly tapering sockets 114, 116. One socket receives a conical seat 118 for the head 120 of bolt 108. The other receives a tapered nut 122. Bolt 108 extends through a tubular connector member 124 that is connected to the rear end of the piston rod 126. The bolt assembly 108, 118, 122 is very similar to the bolt connector that is disclosed in detail in U.S. Pat. No. 3,301,581, granted Jan. 31, 1967 to Douglas F. Windberg.

Figure 9:
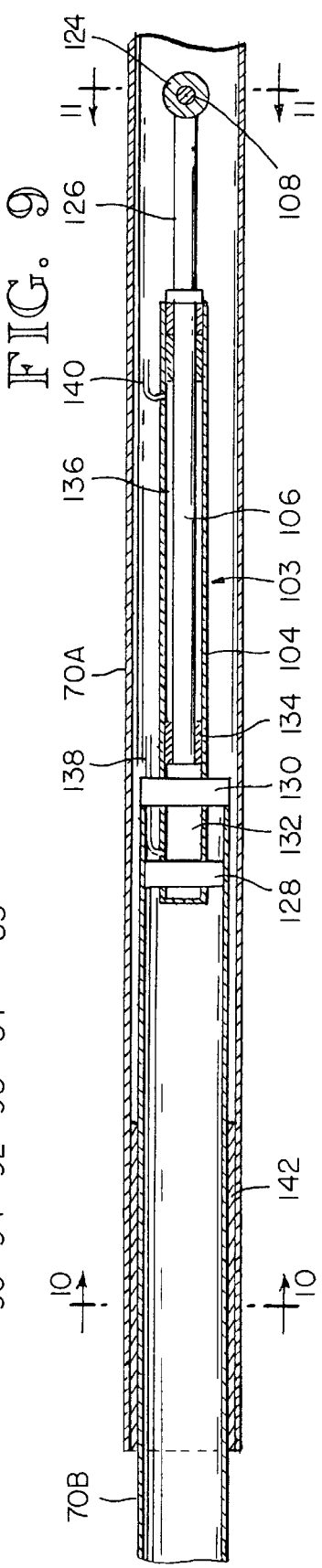
FIG. 9 is a fragmentary longitudinal sectional view of one of the conveyor tubes in the embodiment of FIGS. 5 and 6, taken in the vicinity of where the forward tube section is connected to the rearward tube section.
Figure 11:
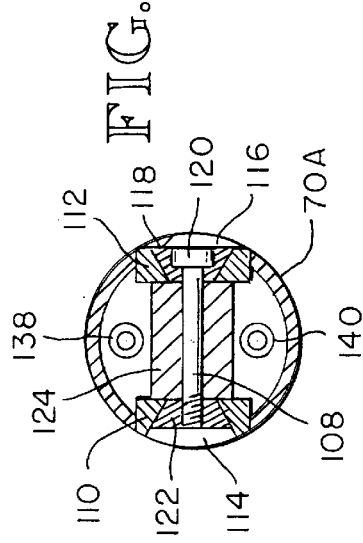
FIG. 11 is a cross-sectional view taken substantially along line 11—11 of FIG. 9.
Figure 10:
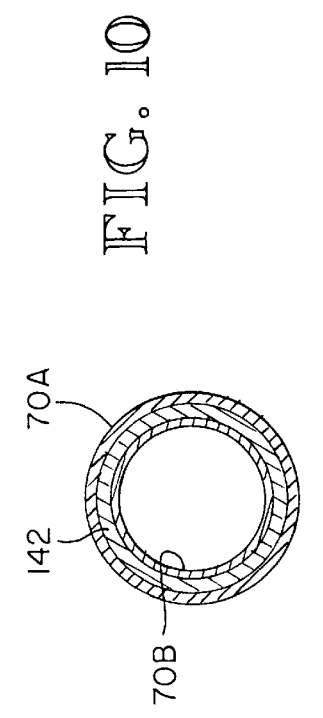
FIG. 10 is a cross-sectional view taken substantially along line 10—10 of FIG. 9.

The cylinder component 104 is connected at 128, 130 to the rear end of conveyor tube section 70B. A working chamber 132 is formed forwardly of a piston head 134. A second working chamber 136 is formed rearwardly of the piston head 134. A first conduit 138 conveys hydraulic fluid into and out from working chamber 132. A second conduit 140 conveys hydraulic fluid into and out from working chamber 136. Conduits 138, 140 extend rearwardly through conveyor tube section 70A, through connectors 90, 92, and on to a switching valve and pressure and return lines (not shown). Referring to FIG. 9, introduction of hydraulic fluid into working chamber 132, and removal of hydraulic fluid from working chamber 136, will cause a forward movement of conveyor tube section 70B. Introduction of hydraulic fluid into working chamber 136 and removal of hydraulic fluid from working chamber 132 will cause a retraction of conveyor tube section 70B. A tubular sleeve bearing 142 is positioned between the forward end part of conveyor tube section 70A and the rearward end part of conveyor tube section 70B. Bearing 142 may be a cylindrical sleeve of a high molecular weight resinous material (known as UHMW). Bearing 142 reduces friction where relative sliding movement occurs between two conveyor tube sections 70A, 70B. It also serves to brace conveyor tube section 70B relative to conveyor tube section 70A, so that conveyor tube section 70B will move in a relatively straight line. FIG. 12 shows conveyor tube section 70B retracted relative to conveyor tube section 70A. FIG. 13 shows conveyor tube section 70B extended relative to conveyor tube section 70A.

In use, conveyor tube section 70B can be extended or retracted relative to conveyor tube section 70A. The drive units 83 for conveyor tube sections 70A can be used alone for reciprocating the conveyor tubes 70A, 70B. The drive units 83 can be extended together to move all of the conveyor tubes 70A, 70B forwardly. Then, the conveyor tubes 70A, 70B can be retracted, one set at a time. The embodiment of FIGS. 5–13 is composed of four groups and three sets. Each group includes one 70A, 70B conveyor tube assembly from each set. The drive mechanisms for the 70A conveyor tubes may be like the drive mechanism disclosed in my U.S. Pat. No. 5,605,221, granted Feb. 25, 1997.

Referring to FIG. 6, the entrance to the auger section has a height h that is substantially shorter than the height of the container 62 in its main portion. As a result, movement of both conveyor tube sections 70A, 70B together towards the auger 80 will cause the material to pile up against the wall section that is above the entrance to the auger 80. This is because more material is moved than can pass through the outlet opening. When this happens, conveyor tube sections 70A are stopped. Then, conveyor tube sections 70B are used alone for moving material onto the auger 80. The conveyor tube sections 70B are all extended outwardly from stationary conveyor tube sections 70A, for advancing material towards the auger 80. Then, the conveyor tube sections 70B are retracted, one set at a time, back into the conveyor tube sections 70A. This is done until the pile up of material at the entrance to the auger 80 is reduced a sufficient amount. Then, the conveyor tube sections 70A, 70B are again moved together, for again conveying material forwardly from the rear of the compartment 62.

The forward ends of conveyor tube sections 70B are closed. This is done either by providing an end wall on or a plug inside the forward end portion of each of the conveyor tube sections 70B. An advantage of this closed end arrangement, is that material on the floor of the container 62, directly forwardly of the forward end of conveyor tube sections 70B is pushed forwardly by the conveyor tube sections 70B, as they move forwardly. This feature can also be employed in a conveyor that has a single conveyor tube rather than a two section conveyor tube. In other words, if conveyor tube sections 70B were to be omitted, and conveyor tube sections 70A extended forwardly to where conveyor tube sections 70B end, closed ends on such conveyor tubes would push material into the auger 80, or to whatever other discharge station there might be.

Referring to FIGS. 5 and 7, the tubular conveyor members 70 on one side of divider wall 68 may be used alone at occasions. Use of the two side sections may be alternated. Or, both side sections can be used together.

Figure 16:
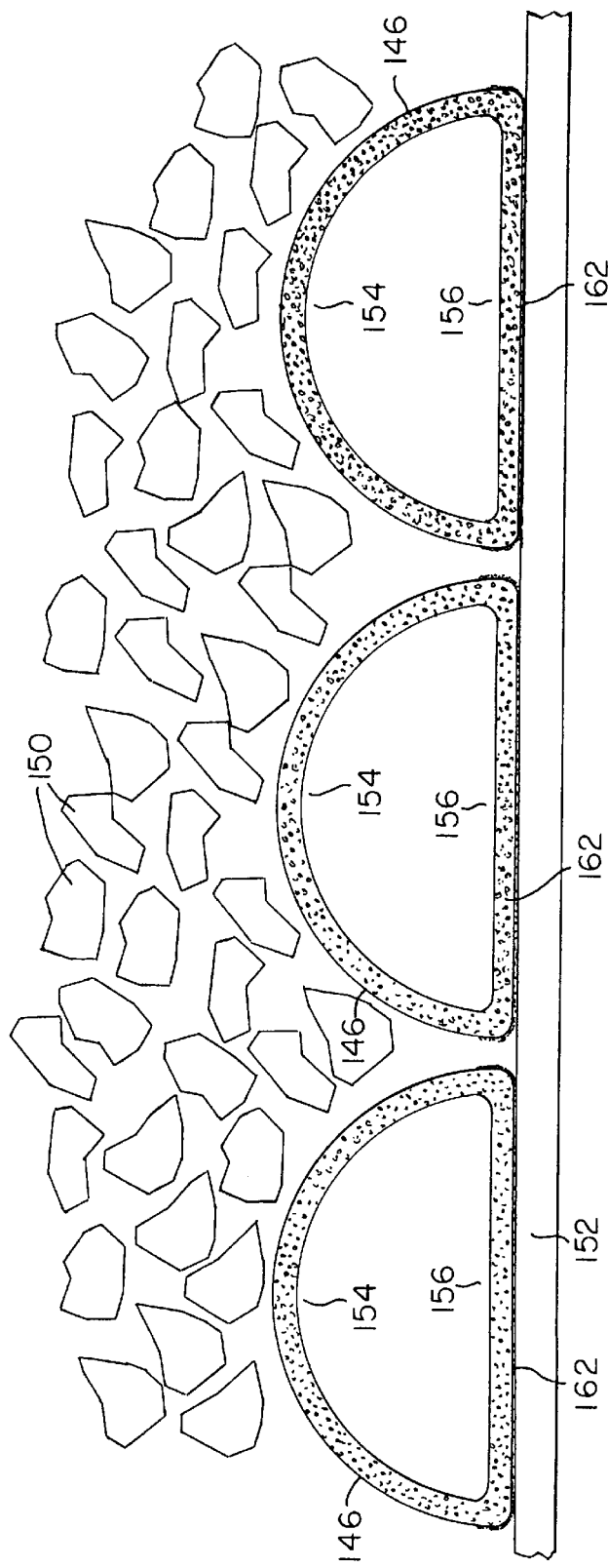
FIG. 16 is a view like FIG. 14, but of a conveyor that includes the D-shaped conveyor tubes.

FIGS. 14–16 show two types of conveyor tube formed by a pultrusion process. The conveyor tubes 144 shown in FIG. 14 are circular in cross-section. The conveyor tubes 146 shown in FIGS. 15 and 16 have a D-shaped cross-section. Referring to FIG. 14, the conveyor tubes 144 comprise reinforcing fibers within a resin matrix. The fibers may be individual strands (i.e. rovings) or may be parts of a woven or unwoven fabric. In FIG. 14, the general body of fibrous material is designated 148. According to one aspect of the invention, the reinforcing fibers 148 and the resin 149 are food grade materials. This means that they can be contacted by food, ice or other human consumable substances. By way of example, in FIG. 14, the particulate material is crushed ice 148. The conveyor tubes 144 rest on and are supported by a food grade UHMW bearing material 150. The ice particles 148 are placed in the compartment 152 which includes the conveyor tubes 144. Material 150 forms the bottom or floor of compartment 152. The crushed ice 148 is shown positioned on top of the conveyor tubes 144. In this embodiment, the conveyor tubes 144 are placed relatively close together so as to prevent much ice from falling down between the conveyor tubes 144 onto the material 150. In use, the conveyor operates in the manner previously described. All of the conveyor tubes 144 are advanced for conveying the crushed ice 148 forwardly. Then, the conveyor tubes are stopped. Then, the conveyor tubes 144 are retracted, one set at a time.

The conveyor tubes 146 are D-shaped in cross-section. They have a substantially semicircular upper portion 154 and a flat lower portion 156, joined together to form the tube shape.

In this embodiment, the flat body portion 156 sets down onto the food grade UHMW bearing material 152. The convex upper surfaces of the conveyor tubes 148 provide increased area for contact with the crushed ice particles 150. The increased area increases the friction between the ice particles 150 and the conveyor tubes 146. This is particularly advantageous when the conveyor tubes 146 are being retracted, one set at a time.

Referring to FIG. 15, the conveyor tube body formed by the reinforcement fibers 148 and the resin matrix 146 may be covered inside and out by veils 158, 160. A veil is a cloth material applied to the resin for the purpose of providing the product with surface characteristics different from the surface characteristics of the resin 149. When the conveyor is to be used for moving human consumable substance, it is necessary that veils 158, 160 be food grade materials. In FIGS. 15 and 16, the conveyor slats 146 are also provided with a bottom veil 162. Veil 162 must be a food grade material if the conveyor is going to be used for conveying human consumable substances. It is also a low friction wear resistant material. Veil 162 aid the bottom material 152 facilitate sliding movement of the conveyor tubes 146 when they are being driven back and forth by the drive units.

FIG. 17 shows a modified form of the conveyor shown by FIGS. 1–3. In this embodiment, the conveyor tubes 28 are elevated above the container bottom 22. That is, they are located within the body of material within the container 12. In this embodiment, the entire surface area of each conveyor tube 26 is in contact with the material. One or more transverse support bars (not shown) may be provided for coating the conveyor tubes 28 in the elevated position.

Figure 18:
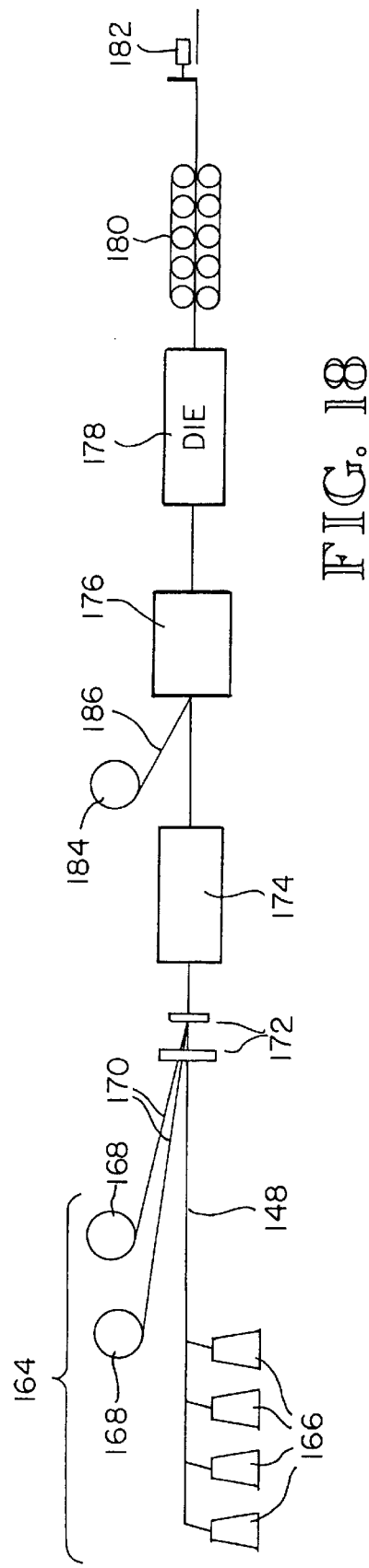
FIG. 18 is a schematic diagram of a pultrusion process used for forming the pultruded conveyor tubes of the present invention.

FIG. 18 is identical to FIG. 1 in my copending application U.S. Ser. No. filed on Apr. 2, 1997, and entitled Pultruded Conveyor Slats. Referring to FIG. 18, a storage region 164 includes bobbins or bundles 166 of reinforcement fiber strands or yarn 148, and reels 168 on which reinforcement fiber fabrics or mats 170 are wound. In the art, the individual fiber strands or yarns 148 are also known as "rovings."

The reinforcement fibers 148 and/or fabrics or mats 170 are delivered to and through guides 172. From the guides 172, they enter an impregnation zone 174 where they are saturated with a liquid thermosetting resin that is reactive yet stable at ambient temperatures. After saturation, the reinforcement fibers 148 and fabrics 170 are moved from the impregnation zone 174 to and through preformers 176. In the preformers 176 they are moved progressively in stages to remove excess resin and to achieve the approximate geometry of the finished profile of the formed member. Following this pre-forming step, the materials are compacted into the final densified conveyor tube structure as they enter the mouth of a pultrusion die 178. The pultrusion die 178 is a self-contained reaction vessel in which rapid polymerization of the resin occurs when exposed to the elevated die temperature environment. The moving material is constrained within the close tolerances of the die as it is being cured. Upon achieving a sufficient level of polymerization, the material is pulled out from the die 178 and is generally allowed an interval of movement through space so as to cool by natural or forced convection to a level below which the pulling device 180, employed to grip and pull the formed conveyor tube member, will not damage the composite profile. The pulling mechanism 180 is followed by a flying cut-off saw 182 which enables the product to be cut to length without interruption of the continuous pull motion. The veil fabrics may be added to cover the resin coated fabrics before they are introduced into the preformer 176. Or, the veil fabrics may be added to the conveyor tube member downstream of the preforms and upstream of the die 178. FIG. 18 shows a single reel 184 of a veil fabric 186.

For some uses, a layer of grit may be applied to outer surface portions of the conveyor tubes. In particular, the grit would be applied to upper surfaces of the conveyor tubes that are not in contact with the support-member 152. Small glass spheres may be added to the resin matrix to decrease the weight of the conveyor tube and/or improve abrasion resistence an/or reduce surface friction. There are other materials that could be added to the resin matrix in place of or in addition to the glass spheres. They are carbon spheres, aluminum silicate clay, calcium carbonate, aluminum dryhydrate and carbon black. These substances reduce the weight of the conveyor tube. They can also make the conveyor tube fire resistant, impact resistant and abrasion resistant. Some also make it easier to pultrude the cross-section. The most commonly used pultrusion resin for mat/roving laminates is a flexible isophthalic polyester. This resin is more forgiving in composites with sharp radii, different thicknesses and heavy wall cross-sections. The surface remains shiny with minimum scaling at the slower pultrusion speeds. Exotherm stress cracks are essentially eliminated. This resin molds well with the conditions under which structures are pultruded, i.e., slower line speeds due to more difficult part design and consequent reinforcement placement requirements. This resin is set forth by way of example but the invention is not limited to any particular resin. As previously stated, in some applications, it is desired to use a food grade resin. A food grade resin is a resin that can be safely contacted by food products and food grade crushed ice for example. For such conveyors, food grade veil and filler materials would also be used. A vinyl ester resin may be used for applications where corrosion is a major factor. This resin would be used with corrosion resistive fibers and fillers.

Fiberglass is a typical and popular reinforcement fiber material, both for the reinforcement strands and the reinforcement fabric. However, the invention is not limited to the use of glass reinforcement fibers. Other reinforcement fibers may be used, such as nylon fibers, polyester fibers, aramids, and carbon fibers, for example.

The surface veils are fabrics that act as a very thin sponge, absorbing resin to fill about ninety percent (90%) of their volumes. Surface veils are made of polyester, nylon, aramid, phenolic and other types of fibers. Polyester fibers preferably are used for the veils in the conveyor slats of the present invention. As the veils are applied, they are in effect absorbed into the resin. They are not a layer on the resin matrix but rather penetrate into surface regions of the matrix while providing boundary material that is exposed at the surface.

The adhesive used for securing the grit layer to the upper surface of the conveyor slat may be applied by use of a roller. It can be sprayed on the slat surface. A contact nozzle with a bottom doctor knife can be used. Or, a surface wiper or a dip vat can be used. The contents of my copending application U.S. Ser. No. 08/832,370, filed Apr. 2, 1997, and entitled Pultruded Conveyor Slats is hereby incorporated herein by this reference to the application.

The illustrated embodiments are only examples of the present invention and, therefore, are non-limitive. It to be understood than many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. A reciprocating tube conveyor, comprising:
    an elongated, material holding compartment having a bottom and side walls extending upwardly from the bottom;
    a plurality of elongated, generally side-by-side tubes positioned to provide spaces between the tubes;
    each of said tubes having an enclosed continuous circumferential cross-section;
    said tubes having outside surfaces, at least some of which are positioned to be in contact with material in the material holding compartment; and
    a drive mechanism for reciprocating said tubes, including drive members for said tubes, one for each tube, said drive members being connected to common ends of the tubes, and said drive mechanism functioning to move the tubes in one direction for holding material that is on and between the tubes, and for retracting the tubes in the opposite direction.

2. A reciprocating tube conveyor according to claim 1, wherein said tubes are>generally circular in cross-section.

3. A reciprocating tube conveyor according to claim 1, including a generally horizontal support surface, wherein the tubes are above the support surface.

4. A reciprocating tube conveyor according to claim 3, wherein the support surface is constructed from a low friction material.

5. A reciprocating tube conveyor according to claim 4, wherein the tubes make at least some contact with the support surface.

6. A reciprocating tube conveyor according to claim 3, wherein the tubes make at least some contact with the support surface.

7. A reciprocating tube conveyor according to claim 3, wherein the tubes are spaced upwardly from the support surface throughout at least a portion of their lengths.

8. A reciprocating tube conveyor according to claim 7, wherein the tubes are substantially circular in cross-section.

9. A reciprocating tube conveyor according to claim 1, wherein the tubes are constructed from metal.

10. A reciprocating tube conveyor according to claim 1, wherein the tubes are constructed from a structural plastic material.

11. A reciprocating tube conveyor according to claim 10, wherein the tubes are constructed from a wear-resistant resin material reinforced by fibers.

12. A reciprocating tube conveyor according to claim 1, wherein the tubes are in sets, the drive mechanism includes a transverse drive beam for each set of tubes, and the drive members extend from the drive beams to said ends of the tubes.

13. A reciprocating tube conveyor according to claim 1, comprising a separate drive unit for each tube, said drive units having fixed portions and movable portions, said movable portions being connected to said tubes.

14. A reciprocating tube conveyor, comprising:
    an elongated material compartment having a bottom and side walls extending upwardly from the bottom;
    a plurality of elongated tubes positioned generally side-by-side in the compartment, each said tube having a first 70A portion and a second 70B portion that is a telescopic engagement with the first portion, said first portion having a first end and a second end, said second portion having a first end inside the first portion and a second end outside the first portion spaced endwise outwardly from the second end of the first portion, said tubes presenting outer surfaces towards material within the material receiving compartment;
    a first piston-cylinder drive unit connected to the first end of the first portion of each tube;
    a second piston-cylinder drive unit inside the first portion of each tube, connected to the first portion of the tube and connected to the first end of the second portion of said tube;
    each said first drive unit serving to push its tubes for moving material that is in contact with its tubes and serving to pull the tubes for retracting them to a start position; and each said second drive unit serving to push the second portions of the tubes outwardly from the first portion of the tubes, for moving material in contact with the second portions of the tubes, and serving to pull second portions of the tubes back into the first portions of the tubes, for retracting them to a start position.

15. A reciprocating tube conveyor according to claim 14, including a generally horizontal support surface, wherein the tubes are above the support surface.

16. A reciprocating tube conveyor according to claim 15, wherein the support surface is constructed from a low friction material.

17. A reciprocating tube conveyor according to claim 16, wherein the tubes make at least some contact with the support surface.

18. A reciprocating tube conveyor according to claim 15, wherein the tubes are spaced upwardly from the support surface throughout at least a portion of the lengths.

19. A reciprocating tube conveyor according to claim 14, wherein the tubes are generally circular in cross-section.

20. In combination:
   a storage container for a particulate material comprising a bottom and four side walls, wherein three of the side walls extend upwardly from the bottom and the fourth side wall extends from a discharge opening adjacent the bottom; and
   a reciprocating tube conveyor in the container comprising:
   a plurality of elongated tubes positioned generally side-by-side above the bottom, each said tube having a first portion and a second portion and telescopic engagement with the first portion, said first portion having a first end and a second end, said second portion having the first end inside the first portion and a second end outside the first portion spaced endwise outwardly from the second end of the first portion;
   said tubes having outer surfaces that are in contact with material that is in the storage container;
   a first piston-cylinder drive unit connected to the first end of the first portion of each tube;
   a second piston-cylinder drive unit inside the first portion of each tube, connected to the first portion of the tube and connected to the first end of the second portion of the tube;
   said first drive unit serving to push the tubes, for moving material that is in contact with the outer surfaces of the tubes towards the discharge opening and pulling the tubes for retracting them to a start position; and
   said second drive unit serving to push the second portion of the tube outwardly from the first portions of the tubes, for moving particulate material in contact with the outer surfaces of the second portions of the tubes towards the discharge opening, and pulling the second portions of the tubes back into the first portions of the tubes, for retracting them to a start position.

21. A storage container and reciprocating tube conveyor according to claim 20, wherein the tubes are generally circular in cross-section.

22. A storage container and reciprocating tube conveyor according to claim 21, where the bottom includes an upper surface constructed from a low friction material and the tubes make contact with such surface of low friction material.

23. A storage container and reciprocating tube conveyor according to claim 22, wherein the tubes are constructed from metal.

24. A storage container and reciprocating tube conveyor according to claim 22, wherein the tubes are constructed from a structural plastic material.

25. A storage container and reciprocating tube conveyor according to claim 20, wherein the second drive units provide a longer stroke of movement than the first drive units.

* * * * *